May 1, 1962 J. W. THOMAS 3,032,175
VIBRATED CONVEYOR

Filed Feb. 26, 1958 2 Sheets-Sheet 1

INVENTOR.
JOHN W. THOMAS
BY
Hyde, Meyer, Baldwin & Doran
ATTORNEYS

INVENTOR.
JOHN W. THOMAS
BY Hyde, Meyer, Baldwin & Doran
ATTORNEYS

United States Patent Office 3,032,175
Patented May 1, 1962

3,032,175
VIBRATED CONVEYOR
John W. Thomas, Mayfield Heights, Ohio, assignor to The Cleveland Vibrator Company, Cleveland, Ohio, a corporation of Ohio
Filed Feb. 26, 1958, Ser. No. 717,618
4 Claims. (Cl. 198—220)

This invention relates to novel and improved means for moving material along a deck, trough, pipe, or the like by vibratory means operatively attached to said deck, trough or pipe. It is particularly adapted for the movement of bulk material which is powdered, granulated, or comminuted, or for small parts such as nuts, bolts, washers or in fact any relatively small piece solids. For simplicity, in the present specification and the appended claims we will use the word "conveyor" when referring to the vibrated material advancing device, whether it be a plate, trough or enclosure such as a pipe.

An object of the invention is to provide simple, positive and economical means for the movement of materials as aforesaid.

A further object of the invention is to provide means for advancing bulk material, wherein a vibrated conveyor is mounted on springs, and the springs are arranged at a predetermined angular relationship to the conveyor in such manner as to more efficiently advance the material.

Other objects and advantages will be apparent from a study of the following description of several embodiments of our invention, in conjunction with the accompanying drawings, in which.

Figure 1:
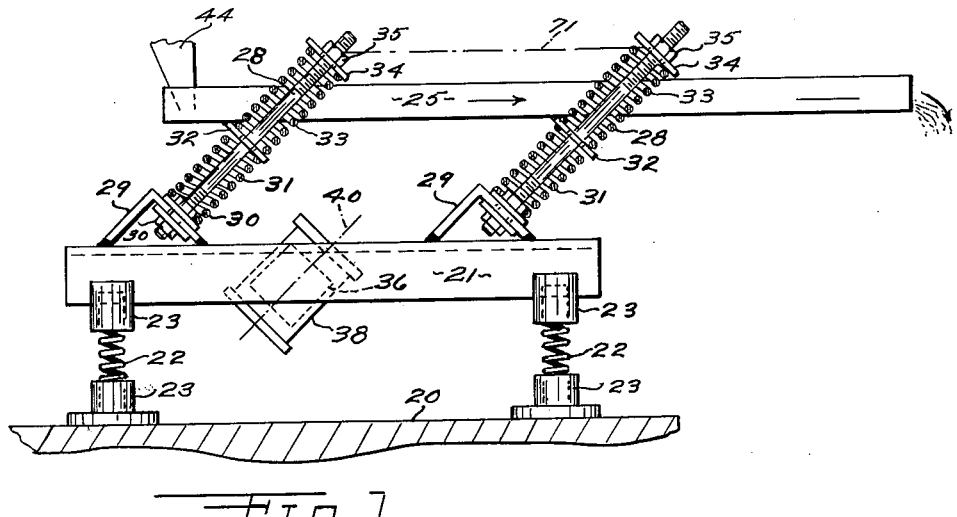
FIG. 1 is a side elevational view of a vibrated conveyor structure embodying our invention.
Figure 2:
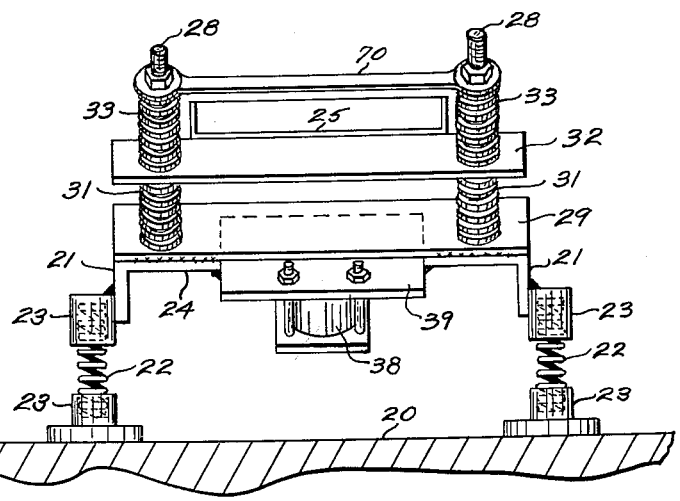
FIG. 2 is an end elevational view as seen from the right of FIG. 1.

Referring first to FIGS. 1 and 2 we show a floor 20 or other rigid structure. A "floating" frame or base 21 is supported above the floor by means of helical springs 22 having their ends inserted in cups 23 on the floor and on the frame. Frame 21 may be built up in any suitable way from longitudinal angle side members, or otherwise. As shown the side members are braced by cross pieces 29. A conveyor tray 25 is resiliently supported above the floating base. The conveyor is here shown as a shallow tray but it could be a deeper trough or a pipe or other material retaining means. The conveyor is carried in the following manner.

Rods 28 are attached at their lower ends to the base. For convenience, as shown we provide transverse angle members 29 through holes in which the rod ends extend, being held on both sides of the angle flange by nuts 30. The rods lean to the right at an acute angle, somewhat less than ninety degrees and in the present instance about forty-five degrees although this angle is not critical. Lower helical springs 31 are threaded over about the lower halves of the rods. The conveyor is provided with cross flange members 32 which are suitably perforated on their protruding opposite ends so that they can be likewise threaded over the rods 28 until supported on springs 31. Upper helical springs 33 are now placed around the upper parts of the rods and are retained thereon under adjustable tension by means of washers 34 and nuts 35.

A pneumatic vibrator 38 is fixed to a bracket 39 on one of the cross pieces 24 of the base. This vibrator is of the conventional type in which, under the influence of supplied compressed air, a piston 36 reciprocates rapidly on an axis represented by the broken line 40 of FIG. 1. It may be noted that this axis should preferably be parallel to the disposition of rods 28.

When vibrator 38 is energized so that its piston 36 reciprocates rapidly on the axis 40, a vibratory force is communicated to the floating base 21 and is thence communicated through rods 28 and springs 31 and 32 to conveyor 25. With such an arrangement the conveyor rides with the springs as they oscillate in a direction parallel to the center line of the rods, and likewise parallel to the axis of piston movement. The oscillations of the conveyor produce bulk flow to the right, FIG. 1, of material discharged on the conveyor through chute 44.

It is desirable, for most efficient results, that lower springs 31 or upper springs 33, or both, be excited to approximately the natural frequency of the springs. For this purpose it is best that the springs be selected for matched characteristics. Large amplitudes of vibration can be secured in this way. Somewhat reduced amplitudes can be achieved by exciting the springs to frequencies constituting harmonics of their natural frequencies.

One of the novel features of the present invention resides in the fact that an air cushion reciprocating vibrator is being used to excite a multi-spring system wherein the vibrator is not attached to the conveyor but to a base resiliently united to the conveyor.

While an air cushion vibrator is preferred, other types can be arranged to operate satisfactorily. An "impact" air vibrator can be used, or an electric vibrator with movable armature, or a mechanical vibrator of the eccentric weight rotary type. Since the vibrator is isolated from the conveyor, any impact or other individualistic operation characteristic of a particular type vibrator will not cause objectionable flutter in the conveyor.

One of the factors in the determination of the natural frequency of the spring system is the weight of the loaded conveyor. We have observed that operation is most efficient when the weight of the floating base is approximately equal to the weight of the empty conveyor.

Figure 3:
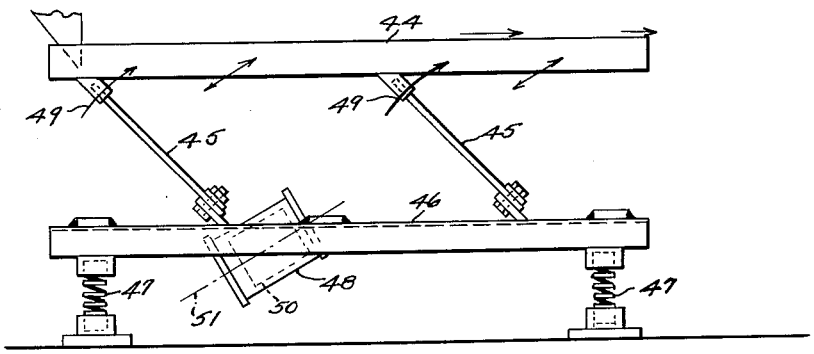
FIG. 3 is a side elevational view of another embodiment of the invention.

FIG. 3 shows a system in which the conveyor 44 is carried on resilient leaf or rod members 45, these members being attached at their lower ends to the base 46 which in turn is resiliently mounted on the floor by springs 47. As in the previous embodiment a vibrator 48 is fixed to the base. The arc represented by the arrows 49 at the upper ends of resilient members 45 indicates the small segmental movement of the conveyor, and is roughly a line parallel to the axis of reciprocation of the vibrator piston 50, the axis being indicated by the broken line 51.

Figure 4:
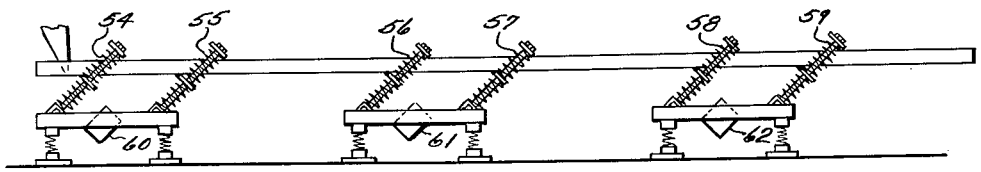
FIG. 4 is a side elevational view of still another embodiment of the invention.

FIG. 4 illustrates an embodiment in which a plurality of spring suspensions 54, 55, 56, 57, 58, 59 support a conveyor of considerable length. Each pair of spring suspensions has a vibrator, 60, 61, or 62 therebetween. In such a case where there are a plurality of vibrators, no special attempt need be made to get the vibrators synchronized in phase. These vibrators can be out of phase with each other but the spring systems will rapidly assume a phased relationship.

Figure 5:
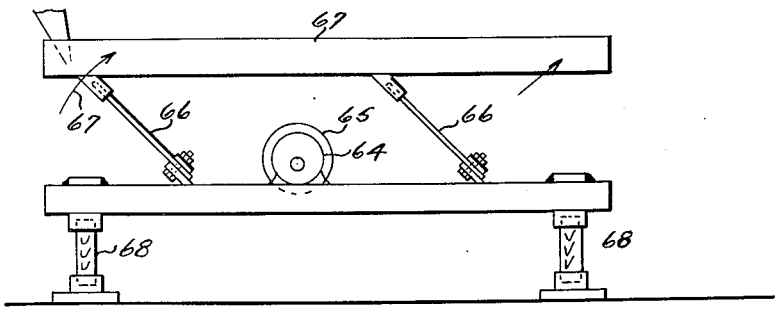
FIG. 5 is a side elevational view of yet another embodiment of the invention.

FIG. 5 illustrates somewhat schematically, the use of an eccentric weight rotating vibrator element 64 driven by an electric motor 65. Here again, as in FIG. 3, the arc 67 represents the path of travel of the suspension zone, and the direction of movement is at an acute angle to the floor of conveyor 67. In this particular instance the base is mounted on wooden columns 68. These are flexible enough for practical purposes although they do not afford the extra resiliency of springs.

As shown in FIG. 2, cross tie means 70 is provided between the upper ends of rods 28. Similar tie means is indicated by the broken line 71 in FIG. 1. Such tie means is easily supplied and adds rigidity, as well as maintaining the parallelism of the rods.

The salient feature of the present invention is the attachment of a vibrator to a relatively movable base, the material conveyor being resiliently carried on the base, there being no direct connection between the vibrator and the conveyor.

What is claimed is:

1. Means for advancing material comprising a conveyor for said material, a fixed support, a base resiliently mounted on said fixed support, a plurality of rods extending upwardly at an angle from said base, a helical spring threaded on each rod, said conveyor having parts supported on said helical springs, a vibrator fixed on said base, said vibrator being provided with an axially reciprocating piston, the axis of reciprocation of said piston being parallel to said rods.

2. Material advancing means as defined in claim 1 wherein each said rod has a pair of helical springs threaded thereon, and said conveyor has a supporting part gripped between each said pair of helical springs.

3. Material advancing means as defined in claim 1 wherein each said rod is connected to said base at an acute angle opening in the direction of material movement.

4. Means for advancing material comprising a conveyor for said material, a fixed support, a base, a plurality of helical springs each having its lower end resting on said fixed support and carrying said base on its upper end, a vibrator fixedly attached to said base a plurality of springs extending upwardly from said base, said last named springs being of helical character and each such spring having an upper section and a lower section, said conveyor being carried on suspension brackets disposed between said upper section and said lower section, the axes of all upper and lower helical spring sections being inclined to said base at an acute angle opening in the direction of material movement, said vibrator having an axis of vibration substantially parallel to said spring axes.

References Cited in the file of this patent
UNITED STATES PATENTS

| | | |
|---|---|---|
| 2,353,492 | O'Connor | July 11, 1944 |
| 2,684,754 | Bankauf et al. | July 27, 1954 |
| 2,861,548 | Burgess et al. | Nov. 25, 1958 |
| 2,868,357 | Thomas | Jan. 13, 1959 |